US012311684B2

(12) United States Patent
Yokoyama

(10) Patent No.: US 12,311,684 B2
(45) Date of Patent: May 27, 2025

(54) PRINTER DEVICE AND PRINTER DEVICE CONTROL METHOD

(71) Applicant: TOSHIBA TEC KABUSHIKI KAISHA, Tokyo (JP)

(72) Inventor: Shuji Yokoyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 18/177,149

(22) Filed: Mar. 2, 2023

(65) Prior Publication Data

US 2024/0294017 A1 Sep. 5, 2024

(51) Int. Cl.

*B41J 11/00* (2006.01)
*B41J 3/01* (2006.01)
*B41J 11/42* (2006.01)

(52) U.S. Cl.

CPC ................. *B41J 3/01* (2013.01); *B41J 11/42* (2013.01); *B41J 11/003* (2013.01)

(58) Field of Classification Search

CPC ....... G06K 15/16; B41J 11/00; B41J 2/04586; B41J 11/003; G03G 2215/00392; B65H 2511/12; B65H 2220/02

See application file for complete search history.

(56) References Cited

U.S. PATENT DOCUMENTS

| | | | | |
|---|---|---|---|---|
| 5,689,759 A * | 11/1997 | Isemura | G03G 15/6514 | 399/45 |
| 6,213,659 B1 * | 4/2001 | Elgee | B41J 11/003 | 400/709 |
| 6,304,342 B1 * | 10/2001 | Komada | H04N 1/2338 | 347/3 |
| 9,223,275 B2 * | 12/2015 | Totsuka | G03G 15/502 | |
| 2002/0024575 A1 * | 2/2002 | Sato | B41J 11/485 | 347/104 |
| 2003/0016259 A1 * | 1/2003 | Otokita | B41J 11/009 | 347/14 |
| 2004/0184043 A1 * | 9/2004 | Hirosugi | B41J 2/04586 | 358/1.15 |
| 2016/0012320 A1 | 1/2016 | Takahashi et al. | | |
| 2019/0240990 A1 * | 8/2019 | Seki | B41J 29/38 | |
| 2021/0276819 A1 * | 9/2021 | Morimoto | B41J 15/18 | |
| 2022/0201134 A1 * | 6/2022 | Toake | H04W 48/08 | |

* cited by examiner

*Primary Examiner* — John Zimmermann

(74) *Attorney, Agent, or Firm* — Amin, Turocy & Watson, LLP

(57) ABSTRACT

According to one embodiment, a printer device includes regulating members provided in a conveyance path of paper or an accommodation unit of the paper, and regulating side edges of the paper in a width direction and having a variable regulating width, a detection unit configured to detect a paper width of the paper based on the regulating width of the regulating members, and a processor. The processor is configured to store the paper width detected by the detection unit in a storage unit, control printing of the paper in the width direction based on the paper width stored in the storage unit, and update the paper width stored in the storage unit according to a variation in the paper width if the paper width newly detected by the detection unit is varied from the paper width stored in the storage unit.

20 Claims, 5 Drawing Sheets

*FIG. 4*

1043

| | |
|---|---|
| ERROR RANGE | C |

*FIG. 5*

1043

| | ERROR RANGE |
|---|---|
| EXPANSION DIRECTION | C1 |
| REDUCTION DIRECTION | C2 |

PRINTER DEVICE AND PRINTER DEVICE CONTROL METHOD

FIELD

Embodiments described herein relate generally to a printer device, a barcode printer, and a printer device control method.

BACKGROUND

In the related art, some printer devices such as bar code printers detect a paper width using paper guides that can move in the width direction of the paper. With such a configuration, user places the paper between the paper guides in the width direction of the paper and the paper width can be detected. The printer device determines the print start position in the width direction of the paper based on the detected paper width.

However, in the printer device having the configuration described above, the detected value of the paper width varies according to the amount of force applied by the user who operates the paper guides. Accordingly, even if the paper with the same paper width is used, there is a possibility that the print start position may vary each time the positions of the paper guides are adjusted if the paper is replaced.

DESCRIPTION OF THE DRAWINGS

FIG. 4 is a diagram schematically showing an example of a data configuration of error range information;

FIG. 5 is a diagram schematically showing another example of the data configuration of the error range information;

DETAILED DESCRIPTION

In general, according to one embodiment, a printer device includes regulating members provided in a conveyance path of paper or an accommodation unit of the paper and regulating side edges of the paper in a width direction and having a variable regulating width, a detection unit configured to detect a paper width of the paper based on the regulating width of the regulating members, and a processor. The processor is configured to store the paper width detected by the detection unit in a storage unit, control printing of the paper in the width direction based on the paper width stored in the storage unit, and update the paper width stored in the storage unit according to a variation in the paper width if the paper width newly detected by the detection unit is varied from the paper width stored in the storage unit.

Hereinafter, embodiments will be described in detail with reference to the drawings. It is to be noted that an exemplary embodiment is not limited to the embodiments described below.

Figure 1:
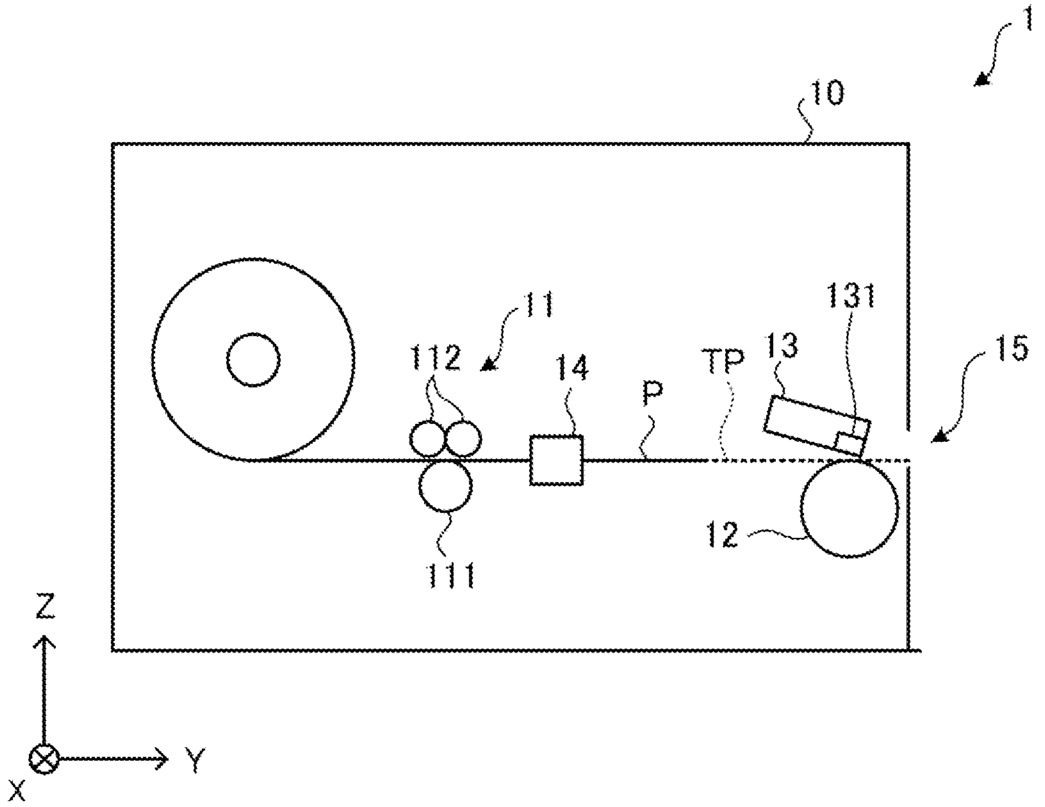
FIG. 1 is a diagram showing a schematic configuration of a printer device of an exemplary embodiment.

FIG. 1 is a diagram showing a schematic configuration of a printer device 1 according to an embodiment. The printer device 1 is one example of the printer device. It is to be noted that the three axes X, Y, and Z shown in the drawing indicate a width direction (X direction), a depth direction (Y direction), and a height direction (Z direction) of the printer device 1 seen from one side.

For example, the printer device 1 includes a box-shaped housing 10 and accommodates paper P inside the housing 10. For example, the paper P is a roll paper wound in a roll. The paper P is not limited to roll paper, and may be paper-sheet-like paper. The housing 10 is configured to be able to open and close to allow paper P supply, and the like.

The printer device 1 includes, provided inside the housing 10, a convey roller 11, a platen roller 12, a printing unit 13, and paper guides 14.

For example, the convey roller 11 includes a capstan roller 111 and an auxiliary roller 112. The capstan roller 111 is arranged at a position facing the convey roller 11. The paper P is inserted between the capstan roller 111 and the auxiliary roller 112.

The platen roller 12 is arranged on a conveyance path of the paper P. More specifically, the platen roller 12 is arranged at a position facing the printing unit 13. The paper P is inserted between the platen roller 12 and the printing unit 13.

The capstan roller 111 and the platen roller 12 are rotationally driven by a conveyance drive unit 106 (see FIG. 3) which will be described below. For example, the conveyance drive unit 106 rotates the capstan roller 111 and the platen roller 12 clockwise in the drawing to convey the paper P in a forward direction (+Y direction) toward a discharge port 15. For example, the conveyance drive unit 106 rotates the capstan roller 111 and the platen roller 12 counterclockwise to convey the paper P in a backward direction (−Y direction) opposite to the forward direction.

In the example, the capstan roller 111, the platen roller 12, and the conveyance drive unit 106 are examples of the convey unit. The discharge port 15 is an opening formed in the housing 10 and provided for discharging the paper P to the outside of the housing 10.

The printing unit 13 is one example of the printing unit. The printing unit 13 includes a print head 131 and prints (or impresses) characters, images, and the like on the surface of the paper P held between the platen roller 12 and the printing unit 13. For example, the print head 131 is a thermal head having a structure in which a plurality of heating elements are aligned. The print head 131 prints on the paper P by heating the heating elements corresponding to a print pattern.

The print head 131 may be configured to print directly on the paper P using thermal paper as the paper P, or may be configured to print on the paper P via an ink ribbon. In the latter case, the ink ribbon is inserted between the platen roller 12 and the printing unit 13 (print head 131), and the print head 131 performs printing by transferring the ink applied on the ink ribbon to the paper P by heat.

The paper guides 14 are provided in the conveyance path TP of the paper P, and regulate the side edges of the conveyed paper P in the width direction. Note that, the width direction of the paper P means a direction (also referred to as a main scanning direction) on the surface of the paper P which is perpendicular to the convey direction. For example, as shown in FIG. 1, the paper guides 14 are provided between the convey roller 11 and the printing unit 13 (the platen roller 12).

Figure 2:
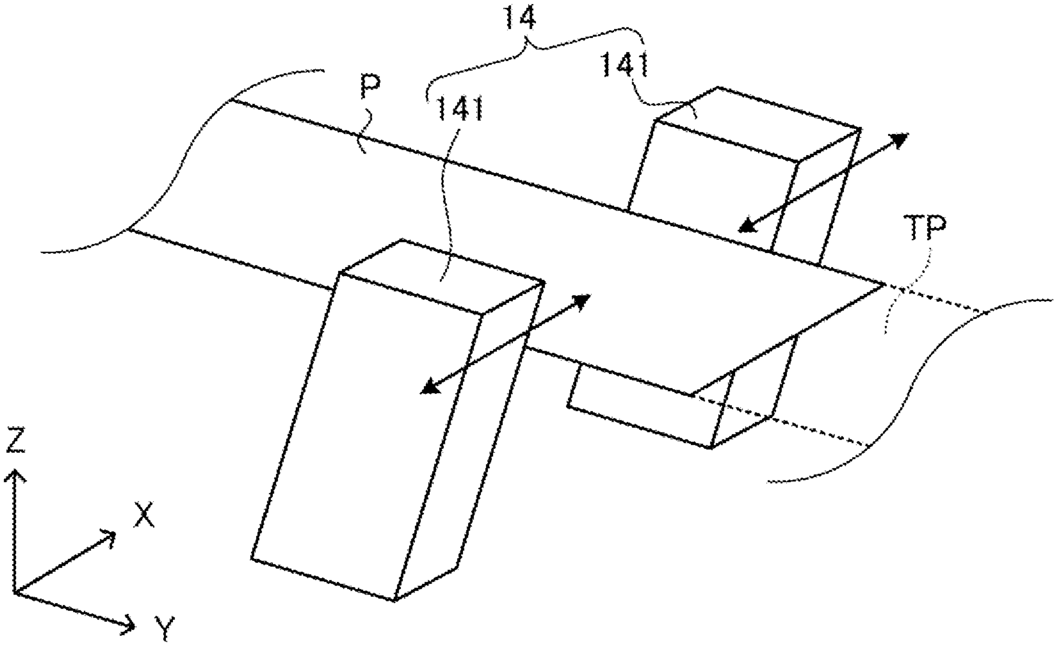
FIG. 2 is a perspective view schematically showing paper guides.

In the example, FIG. 2 is a perspective view schematically showing the paper guides 14 according to the embodiment. As shown in FIG. 2, the paper guides 14 include a pair of paper width regulating members 141. The paper width regulating members 141 are one example of the regulating member. The paper width regulating members 141 are provided at positions facing each other in the width direction of the conveyance path TP.

The paper width regulating members 141 regulate both side edges of the paper P in the width direction, and are configured with a variable regulating width. Specifically, the center between the paper width regulating members 141 corresponds to the center of the conveyance path TP in the width direction. The paper width regulating members 141 are slidably movable in a symmetrical manner on both edge portions sides of the conveyance path TP in the width direction. In other words, the paper width regulating members 141 are slidably movable in a symmetrical manner with respect to the center line that passes the center of the conveyance path TP.

For example, if one paper width regulating member 141 is moved in the +X direction by a predetermined amount, the other paper width regulating member 141 is moved in the −X direction by the same amount. As a result, the paper guides 14 can guide paper P of various sizes.

Note that the configuration (hereinafter also referred to as a sliding configuration) related to the sliding movement of the paper width regulating members 41 is not particularly limited, and any known techniques may be used. For example, the sliding configuration of the paper width regulating members 141 may be implemented with a rack and pinion mechanism or the like.

The paper guides 14 of the present embodiment are provided with a paper width detection unit 107 (see FIG. 3) which will be described below. The paper width detection unit 107 detects the distance between the paper width regulating members 141 as the paper width of the paper P in the width direction. The paper width detection unit 107 may be implemented using a displacement sensor such as a linear potentiometer, or may be implemented using a distance sensor using light or the like.

To replenish or replace the paper P, for example, the user of the printer device 1 slidably moves the paper width regulating members 141 to position the paper width regulating members 141 at positions corresponding to the width of the paper P. The paper width regulating members 141 regulate both side edges of the paper P in the width direction at the slid position.

Note that the position where the paper guides 14 are provided is not limited to the example in FIG. 1. For example, the paper guides 14 may be configured in an accommodation unit in which the paper P is accommodated, to hold the paper P therebetween from both side edges in the width direction. In the printer device 1 of the present embodiment, the paper guides 14 provided in the accommodation unit rotatably hold the roll-shaped paper P therebetween.

Figure 3:
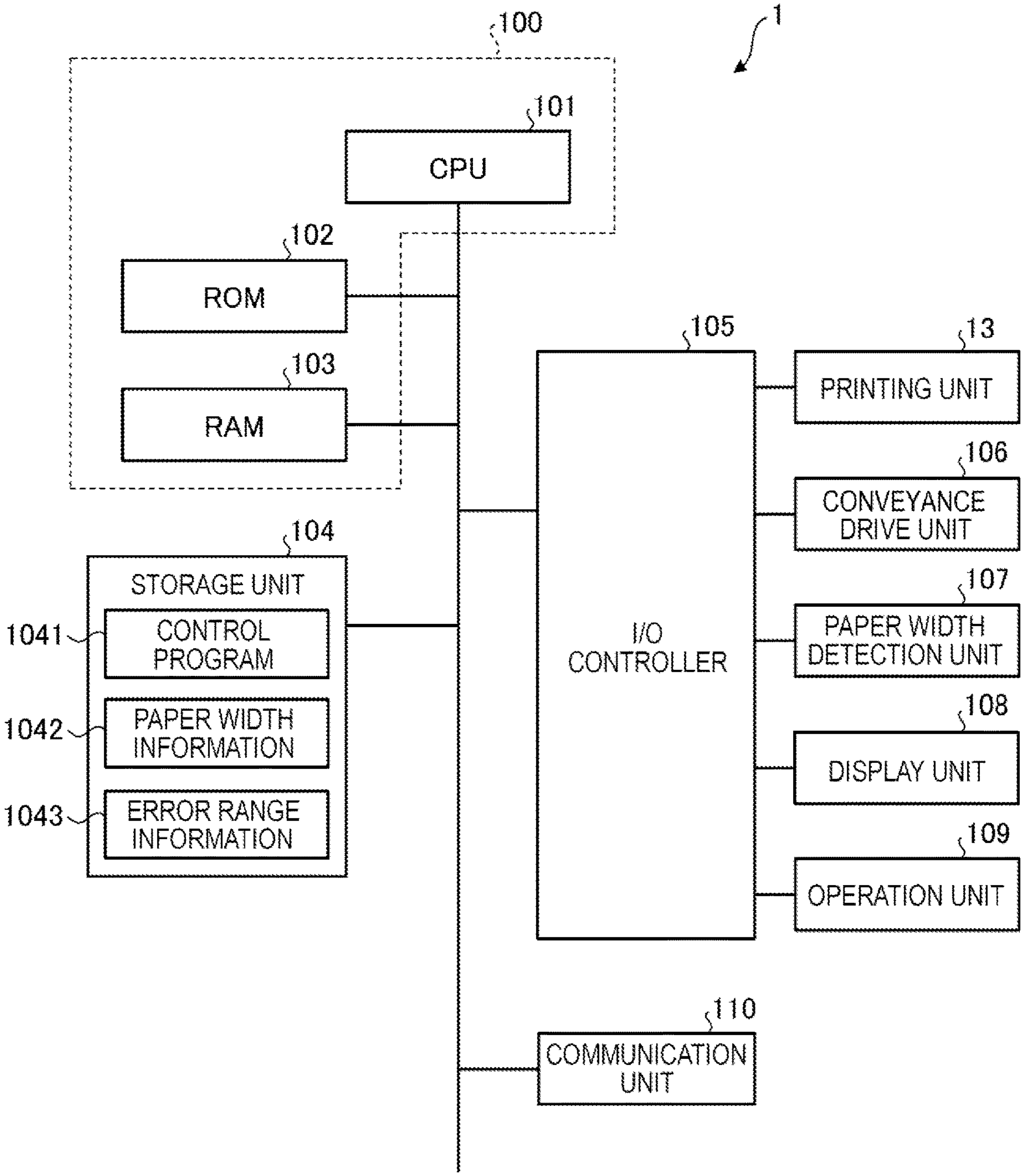
FIG. 3 is a diagram showing an example of a hardware configuration of the printer device.

Next, the hardware configuration of the printer device 1 will be described with reference to FIG. 3. FIG. 3 is a diagram showing an example of a hardware configuration of the printer device 1.

As shown in FIG. 3, the printer device 1 includes a central processing unit (CPU) 101, a read only memory (ROM) 102, and a random access memory (RAM) 103.

The CPU 101 is one example of the processor and serves as a control main body of the printer device 1. The ROM 102 stores various programs. The RAM 103 loads programs and various data. The CPU 101, the ROM 102, and the RAM 103 are connected to each other via a bus or the like. The CPU 101, the ROM 102 and the RAM 103 form a control unit 100 having a computer configuration. That is, the control unit 100 executes controlling related to the operation of the printer device 1 as the CPU 101 is operated according to a control program 1041 stored in the ROM 102 or a storage unit 104 to be described below and loaded to the RAM 103.

The storage unit 104 is one example of the storage unit. The storage unit 104 includes a non-volatile memory such as a hard disc drive (HDD) and a flash memory that retains stored information even if the power is turned off. The storage unit 104 stores the control program 1041 for controlling the operation of the printer device 1. The storage unit 104 also stores various setting information related to the operation of the printer device 1. For example, the storage unit 104 stores paper width information 1042 and error range information 1043.

The paper width information 1042 stores information indicating the paper widths of the paper P used in the printer device 1. Note that the paper width means a width in a direction (also referred to as a main scanning direction) on the surface of the paper P which is perpendicular to the convey direction.

The error range information 1043 stores information defining a numerical range (hereinafter also referred to as an error range), based on which a difference between the paper width detected by the paper width detection unit 107 and the paper width stored in the paper width information 1042 may be considered to be an error.

FIG. 4 is a diagram schematically showing an example of a data configuration of the error range information 1043 according to the embodiment. As shown in FIG. 4, the error range information 1043 stores a value C (a numerical value greater than 0) that defines the error range. In the error range information 1043 in FIG. 4, C defines an upper limit value (+C) and a lower limit value (−C) of the difference between the paper width detected by the paper width detection unit 107 and the paper width stored in the paper width information 1042.

FIG. 5 is a diagram schematically showing another example of the data configuration of the error range information 1043 according to the embodiment. In FIG. 5, the error range information 1043 stores a value C1 (a numerical value greater than 0) that defines an error range in an expansion direction of expanding the distance between the paper width regulating members 141. The error range information 1043 stores a value C2 (a numerical value greater than 0 and different from the C1) that defines an error range in a reduction direction of reducing the distance between the paper width regulating members 141.

In the example, the value C1 is an example of a first threshold, and defines an upper limit value (+C1) of the difference between the paper width detected by the paper width detection unit 107 and the paper width stored in the paper width information 1042. The value C2 is an example of a second threshold, and defines a lower limit value (−C2) of the difference between the paper width detected by the paper width detection unit 107 and the paper width stored in the paper width information 1042.

Note that the value C1 is preferably set to a value greater than the value C2. Because, if the paper guides 14 (the paper width regulating members 141) are slid to hold the side edges of the paper P in the width direction therebetween, the regulating width defined by the distance between the paper width regulating members 141 tends to be loosely set in the expansion direction of expanding the distance between the paper width regulating members 141. By setting the value C1 to a value greater than the value C2, an error range suitable for the moving tendency of the user who operates the paper guides 14 is definable.

Note that the value of the error range set in the error range information 1043 is not particularly limited and can be set as any value. The data configuration of the error range information 1043 is not limited to that shown in FIGS. 4 and 5.

Referring back to FIG. 3, the control unit 100 is connected to an I/O controller 105 that controls data input and output via a bus or the like. In addition to the printing unit 13 described above, the I/O controller 105 is connected to the conveyance drive unit 106, the paper width detection unit 107, a display unit 108, an operation unit 109, and the like. The I/O controller 105 controls I/O between various devices connected to the corresponding I/O controller 105 and the CPU 101.

A conveyance drive unit 106 is a drive source that drives the convey roller 11 and the platen roller 12. For example, the conveyance drive unit 106 includes a stepping motor and the like. Under the control of the control unit 100, the conveyance drive unit 106 rotates the convey roller 11 and the platen roller 12 to convey the paper P on the conveyance path TP.

The paper width detection unit 107 is one example of the detection unit. The paper width detection unit 107 detects the paper width of the paper P in cooperation with the slide mechanism of the paper guides 14. Specifically, the paper width detection unit 107 detects the distance between the paper width regulating members 141 as the paper width of the paper P.

The display unit 108 includes a display device such as a liquid crystal display (LCD). The display unit 108 displays various information under the control of the CPU 101. The operation unit 109 is an example of a switching unit. The operation unit 109 includes input devices such as various operation buttons. For example, the operation unit 109 includes an operation button for switching between enabling and disabling an error tolerance function which will be described below. The operation unit 109 outputs to the CPU 101 the details of the operation received from the user. Note that the operation unit 109 may be a touch panel provided on the display screen of the display unit 108. The user of the printer device 1 can change the settings of the error range information 1043 and the like using the display unit 108 and the operation unit 109, for example.

The control unit 100 is connected to a communication unit 110 via the bus or the like. The communication unit 110 is a wired or wireless communication interface, and communicates with an external device (not shown) such as an information processing device. For example, the communication unit 110 receives, from an external device, print data for printing on the paper P. For example, the communication unit 110 receives, from an external device, information instructing to change settings such as the error range information 1043.

Note that the hardware configuration of the printer device 1 is not limited to the example shown in FIG. 3. For example, in the present embodiment, the printer device 1 is configured to include the display unit 108 and the operation unit 109, but not limited thereto. For example, the printer device 1 may include a connection unit capable of attachably and detachably connecting the display unit 108 and the operation unit 109, and may have a configuration in which the display unit 108 and the operation unit 109 are externally attached via the connecting unit.

Figure 6:
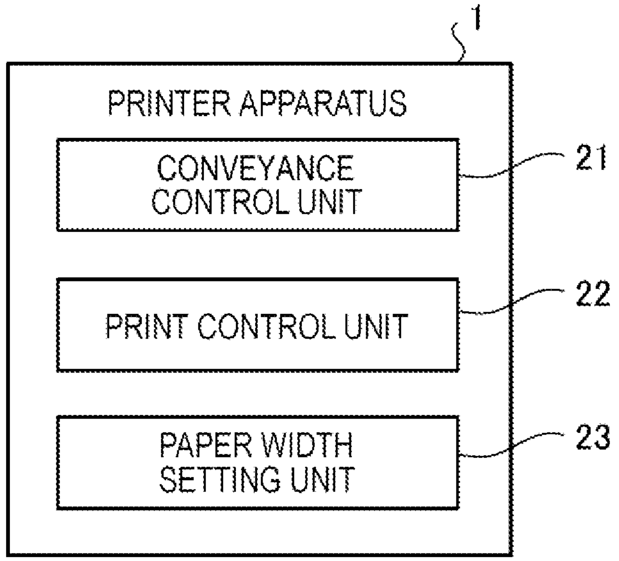
FIG. 6 is a diagram showing an example of a functional configuration of the printer device.

Next, the functional configuration of the printer device 1 will be described. FIG. 6 is a diagram showing an example of the functional configuration of the printer device 1 according to the embodiment. As shown in FIG. 6, the printer device 1 includes, as the functional configurations, a conveyance control unit 21, a print control unit 22, and a paper width setting unit 23.

A part or all of the functional configurations of the printer device 1 may be a software configuration implemented by the processor (for example, the CPU 101) of the printer device 1 in cooperation with the program (for example, the control program 1041) stored in the memory (for example, the storage unit 104). A part or all of the functional configurations of the printer device 1 may be a hardware configuration such as a dedicated circuit mounted on the printer device 1.

The conveyance control unit 21 controls conveyance of the paper P by controlling driving of the conveyance drive unit 106. For example, the conveyance control unit 21 conveys and positions the paper P at the printing position of the printing unit 13. The printing position of the printing unit 13 corresponds to the holding position between the platen roller 12 and the printing unit 13 (the print head 131) in the conveyance path TP of the paper P. The conveyance control unit 21 in cooperation with the print control unit 22 conveys the paper P toward the discharge port 15 according to the printing operation of the printing unit 13. As a result, the paper P printed by the printing unit 13 is discharged from the discharge port 15. The conveyance control unit 21 can convey the paper P not only in the direction (hereinafter also referred to as a feed direction) of the discharge port 15, but also in the reverse direction, that is, in a back feed direction.

The print control unit 22 controls the printing unit 13 to print characters and images on the paper P. Specifically, the print control unit 22 in cooperation with the conveyance control unit 21 heats the heating elements of the print head 131 corresponding to the print pattern of the print data in synchronization with the conveyance of the paper P, thereby printing characters and images on the surface of the paper P based on the print data.

The print control unit 22 sets the print start position of the paper P in the width direction based on the paper width of the paper P and a command that instructs the print start position. Here, the command that specifies the print start position is a command that instructs an amount of blank space (a margin) from one side edge of the paper P in the width direction, for example. Such a command may be included in the print data, or may be read from the storage unit 104 or the like if the printer device 1 is activated, for example. For example, if the command instructs that the margin should be 3 mm, a position that is 3 mm away from one side edge of the paper P in the width direction is the print start position.

Figure 7:
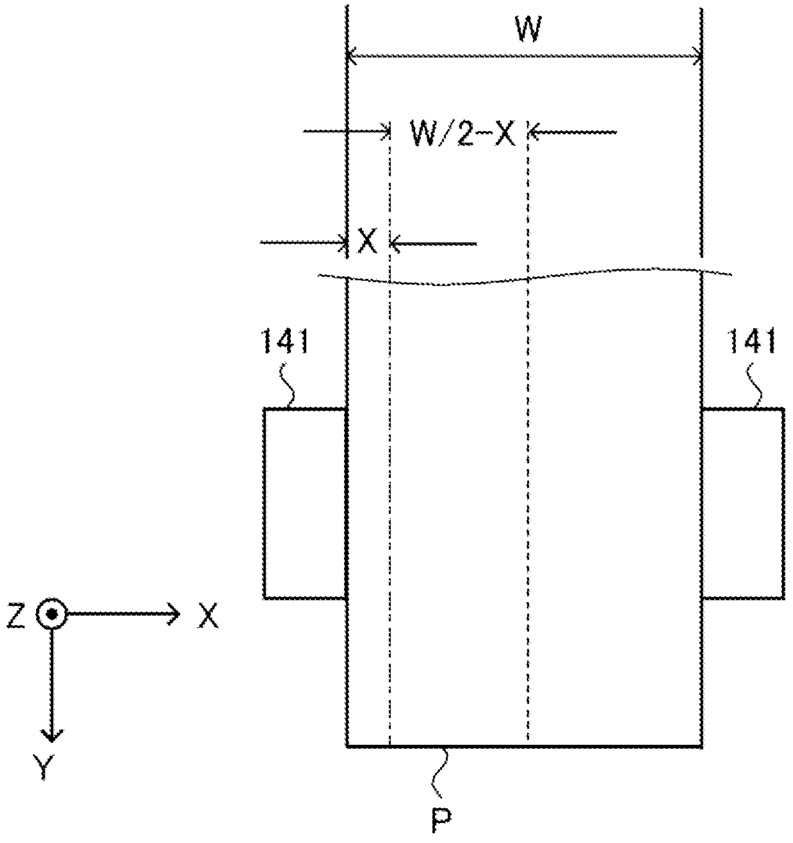
FIG. 7 is a diagram provided to explain an operation of setting a print start position, which is performed by a print control unit.

Hereinafter, the operation of setting the print start position will be described. FIG. 7 is a diagram provided to explain an operation of setting a print start position, which is performed by the print control unit 22 according to the exemplary embodiment. FIG. 7 schematically shows the paper P in the paper guides 14 (the paper width regulating members 141) seen from above. Note that in FIG. 7, a position that is X (mm) away from the left end of the paper P in the width direction is instructed to be the print start position by the command that specifies the print start position.

As described above, in the printer device 1 of the present embodiment, both side edges of the paper P are regulated by the pair of paper width regulating members 141 that can slide in the width direction of the paper P. That is, the position of the side edge of the paper P in the width direction on the conveyance path TP varies according to the size of the paper P. In the command described above, the print start position is specified with reference to the left edge of the paper P in the width direction, but in the configuration of the printer device 1 of the present embodiment, since the position of the left edge of the paper P is unstable, the print start position cannot be specified.

Therefore, based on the paper width W detected by the paper width detection unit 107, the print control unit 22 specifies (sets) the print start position in the width direction of the paper P specified by the command. Then, the print control unit 22 controls printing in the width direction of the paper P by starting printing from the set start position.

Specifically, the print control unit 22 uses, as a reference, the center position of the paper P in the width direction, that is, the center line of the conveyance path TP, which is indicated by the dashed line in the drawing. Here, the center position of the paper P in the width direction is substantially the same position even if the paper P of different sizes is used. Then, the print control unit 22 sets a position at a distance of ((W/2)−X) in the direction of one side edge of the paper P (the left edge in the drawing) from the reference center line as the print start position. In FIG. 7, the print start position is indicated by a one-dot chain line, and corresponds to a position away the left edge of the paper P by a distance of X.

Note that if the print start position specified by the command is based on the center position of the paper P in the width direction, the operation is not limited to the example described above. Here, the print control unit 22 may set a position that is away from the center position of the paper P in the width direction toward one side edge of the paper P by a distance corresponding to the value specified by the command, as the print start position.

In the configuration of the printer device 1 of the present embodiment, the paper width detected by the paper width detection unit 107 may vary according to the amount of force applied by the user who is operating the paper guides 14 (the paper width regulating members 141). Therefore, for example, even when using paper P with the same paper width, each time the positions of the paper guides 14 are readjusted for the replenishment of paper P or the like, the detected paper width may deviate and the print start position may vary.

Therefore, the printer device 1 of the present embodiment includes the paper width setting unit 23 (see FIG. 6) to prevent the print start position from reacting too sensitively to the operation of the paper guides 14.

The paper width setting unit 23 stores the paper width detected by the paper width detection unit 107 in the paper width information 1042. If the paper width newly detected by the paper width detection unit 107 is varied from the paper width stored in the paper width information 1042, the paper width setting unit 23 updates the paper width of the paper width information 1042 according to the variation in the paper width.

Specifically, the paper width setting unit 23 compares the paper width newly detected by the paper width detection unit 107 and the paper width stored in the paper width information 1042 to determine whether the difference is within the error range stored in the error range information 1043.

For example, using the error range information 1043 in FIG. 4, the paper width setting unit 23 determines whether the paper width W1 newly detected by the paper width detection unit 107 is less than a value obtained by adding the value C to the paper width W0 stored in the paper width information 1042 or greater than a value obtained by subtracting the value C from the paper width W0. That is, the paper width setting unit 23 determines whether the paper width W1 is within the error range of W0−C<W1<W0+C.

For example, using the error range information 1043 in FIG. 5, the paper width setting unit 23 determines whether the paper width W1 newly detected by the paper width detection unit 107 is less than a value obtained by adding the value C1 to the paper width W0 stored in the paper width information 1042 or greater than a value obtained by subtracting the value C2 from the paper width W0. That is, the paper width setting unit 23 determines whether the paper width W1 is within the error range of W0−C2<W1<W0+C1.

If determining that the paper width W1 is within the error range, the paper width setting unit 23 maintains the paper width stored in the paper width information 1042 as it is. On the other hand, if determining that the paper width W1 is deviated from the error range, the paper width setting unit 23 stores the paper width newly detected by the paper width detection unit 107 in the paper width information 1042 to update the paper width of the paper width information 1042.

Then, the print control unit 22 sets the print start position of the paper P in the paper width direction based on the paper width stored in the paper width information 1042.

As a result, in the printer device 1, even when a slight deviation occurs in the detection result in the paper width detected by the paper width detection unit 107 due to the user who may increase or decrease their force while operating the paper guides 14, the previous paper width stored in the paper width information 1042 can be continuously used. Therefore, for example, when the paper P having the same paper width is continuously used, the printer device 1 can stabilize the print start position without sensitively reacting to variations in the paper width caused by the increase or decrease of the force applied by the user operating the paper guides 14.

The paper width setting unit 23 in cooperation with the paper width detection unit 107 may control the timing of detecting the paper width. Here, the timing of detecting the paper width can be set as any value without any particular consideration.

For example, the paper width setting unit 23 may detect the paper width if the printer device 1 is activated or restored from an idle state. For example, if the printer device 1 includes a sensor that detects opening and closing of the housing 10, the paper width setting unit 23 may detect the paper width when detecting opening and closing of the housing 10. For example, if the printer device 1 includes a sensor or mechanism capable of detecting replenishment of the paper P, the paper width setting unit 23 may detect the paper width if the replenishment of the paper P is detected. For example, if the printing unit 13 is configured to allow the print head 131 to be retracted from a position facing the platen roller 12, the paper width setting unit 23 may detect the paper width if the print head 131 is retracted. For example, the paper width setting unit 23 may detect the paper width each time the printing unit 13 performs printing, such as immediately before the printing at the printing unit 13.

The function (hereinafter referred to as the error tolerance function) of updating the paper width information 1042 according to the variation in the paper width implemented by the paper width setting unit 23 may be enabled or disabled. For example, if the error tolerance function is enabled via the operation unit 109 or the like, the paper width setting unit 23 updates the paper width based on the error range defined by the error range information 1043. If the error tolerance function is disabled, the paper width setting unit 23 updates the paper width information 1042 with the paper width newly detected by the paper width setting unit 23 regardless of the variation in the paper width.

As described above, by enabling or disabling the error tolerance function, for example, by disabling the error tolerance function of the existing paper P if the paper is replaced with another paper P with a slightly different paper width size, a print start position that accurately reflects the paper width of another paper P may be set.

Figure 8:
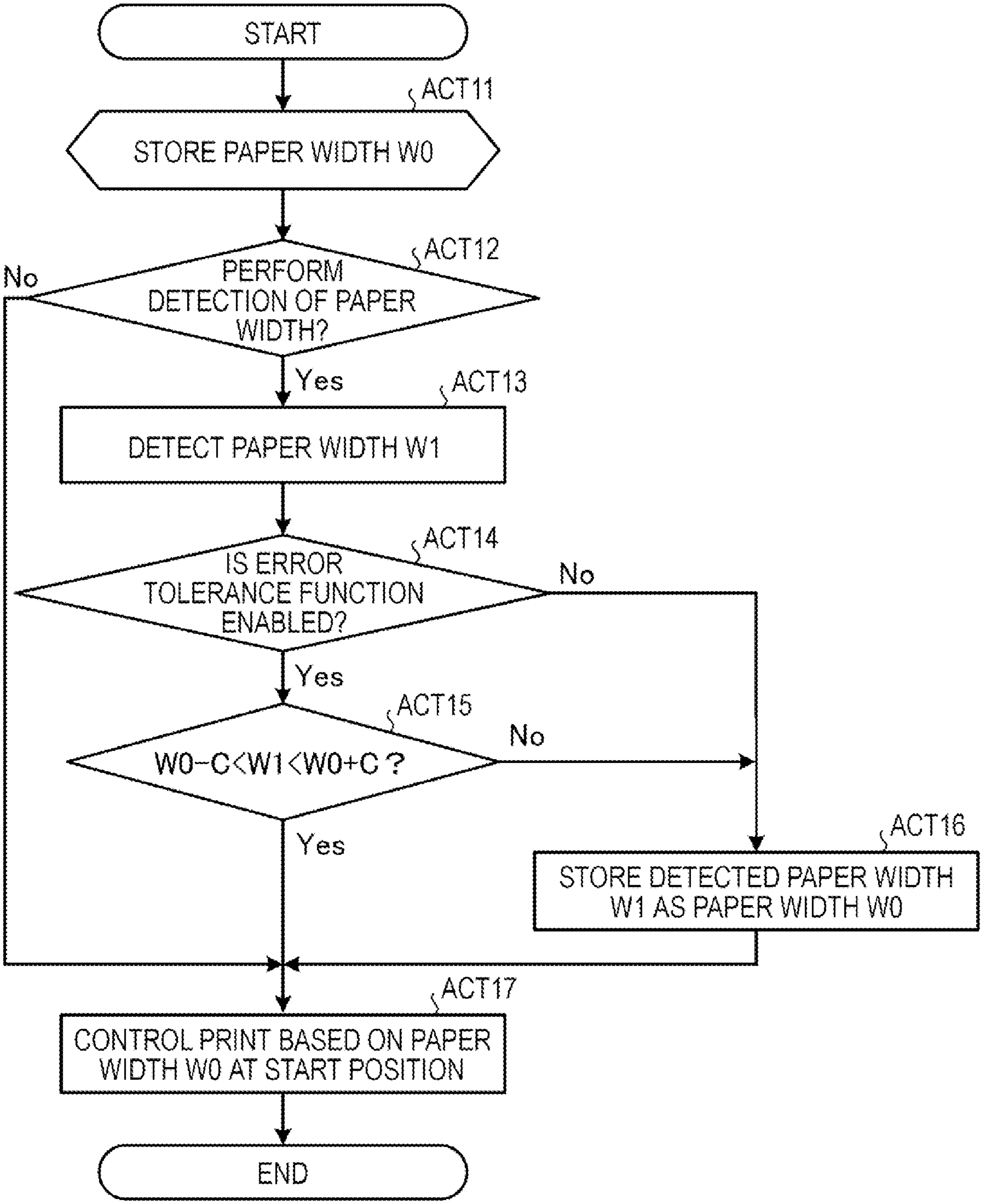
FIG. 8 is a flowchart showing an example of process performed by the printer device.

Hereinafter, an operation example of the printer device 1 will be described with reference to FIG. 8. In the example, FIG. 8 is a flowchart showing an example of process performed by the printer device 1 according to an embodiment. As a premise of the process, the paper width W0, which is the initial value, is stored as the paper width information 1042 (Act 11).

First, the paper width setting unit 23 determines whether it is a detection timing of the paper width (Act 12). If it is not the detection timing (Act 12; No), the process proceeds to Act 17. If it is not the detection timing in Act 12, Act 17 may be skipped and the process may be ended.

If it is determined to be the detection timing of the paper width (Act 12; Yes), the paper width setting unit 23 in cooperation with the paper width detection unit 107 detects the paper width W1 (Act 13).

Then, the paper width setting unit 23 determines whether the error tolerance function is enabled (Act 14). If the error tolerance function is disabled, the paper width setting unit 23 proceeds to Act 16.

If the error tolerance function is enabled, the paper width setting unit 23 compares the detected paper width W1 and the paper width W0 stored in the paper width information 1042 to determine whether the difference is within the error range stored in the error range information 1043 (Act 15). For example, the paper width setting unit 23 determines whether the paper width W1 meets the error range condition of $W0-C<W1<W0+C$.

Here, if it is determined that the paper width W1 is deviated from the error range (Act 15; No), the paper width setting unit 23 proceeds to Act 16. In Act 16, the paper width setting unit 23 stores the paper width W1 detected in Act 13 as the paper width W0 in the paper width information 1042 (Act 16), and proceeds to Act 17.

On the other hand, if the paper width W1 is within the error range, the paper width setting unit 23 maintains the paper width W0 stored in the paper width information 1042 as it is, and proceeds to Act 17.

Then, the print control unit 22 sets the print start position based on the paper width W0 stored in the paper width information 1042, and performs print control at the corresponding start position (Act 17).

As described above, the printer device 1 of the present embodiment includes the paper guides 14 provided in the conveyance path of the paper P, the paper guides 14 regulating the side edges of the paper P in the width direction and having a variable regulating width, and the paper width detection unit 107 configured to detect the paper width of the paper P based on the regulating width of the paper guides 14, and stores the paper width detected by the paper width detection unit 107 in the storage unit 104 (the paper width information 1042), and controls printing in the width direction of the paper P based on the paper width stored in the storage unit 104. The printer device 1 updates the paper width stored in the storage unit 104 according to the variation in the paper width, if the paper width newly detected by the paper width detection unit 107 is varied from the paper width stored in the storage unit 104.

As a result, the printer device 1 can stably set the print start position in the width direction of the paper P without sensitively reacting to the variations in the paper width. Therefore, the printer device 1 can stabilize the print quality.

Note that the embodiment described above can be appropriately modified and implemented by changing a part of the configuration or functions of the printer device 1. Therefore, hereinbelow, certain modifications of the embodiment described above will be described as the other embodiments. In the following description, differences from the embodiment described above will be mainly described, and detailed description of the elements or operations overlapping with those already described will be omitted. The modifications described below may be implemented individually or in combination as appropriate.

Modification 1

In the embodiment described above, the printer device 1 is a thermal printer, but the printing method of the printer device 1 is not limited thereto. For example, the printer device 1 may print by other printing methods such as a laser printer or an inkjet printer.

Note that the program executed by the printer device 1 of the embodiment described above is provided in a state of being installed in advance in a ROM, a storage unit, or the like. The program executed on the printer device 1 according to the embodiment described above may be configured to be provided as a file in an installable format or an executable format recorded on a computer-readable recording medium such as a CD-ROM, a flexible disk (FD), a CD-R, or a digital versatile disk (DVD).

The program executed by the printer device 1 according to the embodiment described above may be stored on a computer connected to a network such as the Internet and provided by being downloaded via the network. The program executed by the printer device 1 according to the embodiment described above may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes s in the form of the embodiments described herein may be made without departing from the spirit of the inventions. The accompanying claims and their equivalents are intended to cover such forms or modifications as would fall within the scope and spirit of the inventions.

What is claimed is:

1. A printer device, comprising:

regulating members, provided in a conveyance path of a paper or an accommodation component of the paper, that regulate side edges of the paper in a width direction and have a variable regulating width;

a detector configured to detect a first paper width of a first paper based on a first regulating width of the regulating members; and a processor configured to:

store the first paper width detected by the detector in a storage component;

control printing in the width direction of the first paper based on the first paper width stored in the storage component;

update a paper width stored in the storage component according to a variation in paper width if a second paper width of a second paper, newly detected by the detector, varies from the first paper width stored in the storage component; and maintain the paper width stored in the storage component if a difference between the second paper width and the first paper width are within a predetermined range, or update the paper width stored in the storage component to the second paper width if the difference deviates from the predetermined range.

2. The printer device according to claim 1, wherein the predetermined range is defined by a first threshold that defines an upper limit and a second threshold that defines a lower limit different from the first threshold.

3. The printer device according to claim 1, further comprising:

a switching component capable of enabling or disabling a function of updating the paper width stored in the storage component according to the variation in the paper width, and the processor is further configured to:

if the switching component is set to enable, update the paper width stored in the storage component to the second paper width newly detected by the detector according to the variation in the paper width, and if the switching component is set to disable, update the paper width stored in the storage component to the second paper width newly detected by the detector regardless of the variation in the paper width.

4. The printer device according to claim 1, wherein the regulating members comprise a pair of paper width regulating members provided at positions facing each other in the width direction.

5. The printer device according to claim 1, wherein the regulating members have a sliding configuration configured to slide in the width direction with a rack and pinion mechanism.

6. The printer device according to claim 1, wherein the printer device is a thermal printer.

7. A method for controlling a printer device, comprising:

storing a first paper width detected by a detector in a storage component, the detector configured to detect a first paper width of a first paper based on a first regulating width of regulating members provided in a conveyance path of the first paper or an accommodation component of the first paper, that regulate side edges of the first paper in a width direction and have a variable regulating width;

controlling printing in the width direction of the first paper based on the first paper width stored in the storage component;

updating a paper width stored in the storage component according to a variation in paper width if a second paper width of a second paper, newly detected by the detector varies from the first paper width stored in the storage component; and maintaining the paper width stored in the storage component if a difference between the second paper width and the first paper width are within a predetermined range, or update the paper width stored in the storage component to the second paper width if the difference deviates from the predetermined range.

8. The method according to claim 7, wherein the predetermined range is defined by a first threshold that defines an upper limit and a second threshold that defines a lower limit different from the first threshold.

9. The method according to claim 7, further comprising:

enabling or disabling a function of updating the paper width stored in the storage component according to the variation in the paper width with a switching component;

if the switching component is set to enable, updating the paper width stored in the storage component to the second paper width newly detected by the detector according to the variation in the paper width; and if the switching component is set to disable, updating the paper width stored in the storage component to the second paper width newly detected by the detector regardless of the variation in the paper width.

10. The method according to claim 7, wherein the regulating members comprise a pair of paper width regulating members provided at positions facing each other in the width direction.

11. The method according to claim 7, further comprising sliding the regulating members in the width direction with a rack and pinion mechanism.

12. A barcode printer, comprising:

a print head;

regulating members, provided in a conveyance path of a roll paper or an accommodation component of the roll paper, that regulate side edges of the roll paper in a width direction and have a variable regulating width;

a detector configured to detect a first paper width of a first roll paper based on a first regulating width of the regulating members; and a processor configured to:

store the first paper width detected by the detector in a storage component;

control printing in the width direction of the first roll paper based on the first paper width stored in the storage component;

update a paper width stored in the storage component according to a variation in paper width if a second paper width of a second roll paper, newly detected by the detector, varies from the first paper width stored in the storage component; and maintain the paper width stored in the storage component if a difference between the second paper width and the first paper width are within a predetermined range, or update the paper width stored in the storage component to the second paper width if the difference deviates from the predetermined range.

13. The barcode printer according to claim 12, wherein the predetermined range is defined by a first threshold that defines an upper limit and a second threshold that defines a lower limit different from the first threshold.

14. The barcode printer according to claim 12, further comprising a switching component capable of enabling or disabling a function of updating the paper width stored in the storage component according to the variation in the paper width, and the processor is further configured to:

if the switching component is set to enable, update the paper width stored in the storage component to the second paper width newly detected by the detector according to the variation in the paper width, and if the switching component is set to disable, update the paper width stored in the storage component to the second paper width newly detected by the detector regardless of the variation in the paper width.

15. The barcode printer according to claim 12, wherein the regulating members comprise a pair of paper width regulating members provided at positions facing each other in the width direction.

16. The barcode printer according to claim 12, wherein the regulating members have a sliding configuration configured to slide in the width direction with a rack and pinion mechanism.

17. The barcode printer according to claim 12, wherein the barcode printer is a thermal barcode printer.

18. The printer device according to claim 1, wherein the predetermined range comprises an error range.

19. The method according to claim 7, wherein the printer device is a thermal barcode printer.

20. The barcode printer according to claim 12, wherein the predetermined range comprises an error range.

* * * * *